United States Patent Office 3,120,569
Patented Feb. 4, 1964

3,120,569
PROCESS FOR THE ISOMERIZATION OF ALKYL BENZENES IN THE PRESENCE OF AN IODIDE-CONTAINING COMPOUND
Clark J. Egan, Piedmont, Calif., assignor to California Research Corporation, San Francisco, Calif., a corporation of Delaware
No Drawing. Filed Dec. 19, 1960, Ser. No. 76,530
2 Claims. (Cl. 260—668)

This invention relates to a process for the catalytic isomerization of alkyl benzenes containing more carbon atoms per molecule than toluene, and, more particularly, to the isomerization of such compounds in the presence of an iodide-containing compound so as to reduce disproportionation (or methyl transfer) and hydrogenation.

At the present time, such alkyl benzenes as the isomeric xylenes are important in the chemical industries. Thus, paraxylene is used as a starting material in the production of polyester fibers; metaxylene is used to produce isophthalic acid, which, in turn, is employed in the manufacture of, for example, plasticizers and alkyd resins for surface coatings; and orthoxylene is used in the production of phthalic anhydride, likewise used in the manufacture of plasticizers and alkyd resins.

A variety of methods have been developed for separating the individual xylene isomers from xylene and ethylbenzene-containing mixtures in relatively high purity. Because of the closeness of the boiling points of the xylenes and ethylbenzene, separation by simple fractionation is not possible so as to obtain essentially pure components and, as a result, the commercial methods that have been developed include fractional crystallization, extraction and superfractional distillation. In any of these methods, a residual xylene fraction containing the non-separated isomers is recovered as a mother liquor, a raffinate, or a distillation fraction, depending upon the particular separation method employed. This residual fraction ordinarily contains more than half of the total xylene material which is subjected to the separation process. The desirability of isomerizing this non-equilibrium fraction to produce further quantities of the wanted isomer is apparent and various methods for accomplishing this result have been suggested. However, it is known that the isomerization reaction is generally accompanied by excessive amounts of disproportionation and, in some cases, hydrogenation also.

It is an object of the present invention to provide an isomerization process wherein these undesirable reactions are considerably reduced.

According to the present isomerization process, an alkyl benzene hydrocarbon feed, said feed containing alkyl benzenes having more carbon atoms per molecule than toluene, is contacted in an isomerization zone, in the presence of hydrogen and at least one iodide compound capable of decomposing under the conditions of temperature and pressure in said isomerization zone, with a catalyst comprising a hydrogenation component selected from the group consisting of nickel sulfide and cobalt sulfide disposed on an active cracking catalyst support. The isomerization zone is maintained at an elevated temperature below about 800° F. and at an elevated pressure above about 300 p.s.i.g. A product fraction is recovered from the isomerization zone in an amount equal to about at least 80 volume percent of the initial feed and which is further characterized by a substantially closer approach to the alkyl benzene isomerization equilibrium than the initial feed stock. When the initial feed is a non-equilibrium mixture of xylenes, the product stream will be further characterized by a $C_8$ aromatic hydrocarbon content of at least 65 volume percent.

Surprisingly, it has been found that the presence of the iodide compound in the reaction zone containing the catalyst of the present invention will essentially eliminate hydrogenation and considerably reduce disproportionation. Further, there is experimental evidence that the improvement cannot be attained in the presence of other decomposable halides, such as fluorides or chlorides.

While the invention will be described with particular emphasis to the isomerization of either a single $C_8$ aromatic isomer or a non-equilibrium mixture thereof (including ethylbenzene), it must be understood that, whereas the xylenes are preferred feed stocks to the present process, the invention is generally applicable to the isomerization of alkyl benzenes containing more carbon atoms per molecule than toluene, including the higher homologs embracing a higher and/or a larger number of alkyl side chains.

As noted above, the alkyl benzene feed is contacted in the isomerization zone in the presence of hydrogen and an iodide compound capable of decomposing under the isomerization conditions maintained in the reaction zone. At least 500, and preferably from 2000 to 3000 s.c.f. (standard cubic feet) of hydrogen per barrel of feed is continually passed into the reaction zone. Preferably, the iodide compound or iodine is likewise continuously passed into the isomerization zone, although the compound can be intermittently introduced thereto if desired. Representative compounds suitable for use in the present process are iodine which forms hydrogen iodide under the conditions maintained in the reaction zone, hydrogen iodide, the alkyl iodides such as ethyl iodide, the butyl iodides, and poly-iodide substituted alkyl compounds, and mono- and/or poly-iodide substituted aromatic compounds such as iodobenzene and di-iodobenzene. The iodide-containing compound of the present invention is limited to hydrogen iodide (which can be derived from the addition of iodine to the reaction zone) and organic iodides inasmuch as inorganic compounds frequently change the character of the catalyst or adversely affect it. Based upon the amount of alkyl benzene feed, the concentration of the iodide compound therein should be above about 0.01 volume percent.

The catalyst employed in the isomerization reaction of the present invention is a catalyst composition comprising nickel sulfide and/or cobalt sulfide as a hydrogenating component disposed on a solid active acid cracking catalyst support. The catalyst support may comprise any one or more of such acidic materials as the conventional cracking catalysts containing composites of silica-alumina, silica-magnesia, silica-alumina-zirconia, acid-treated clays, and the like. In addition, satisfactory results can be obtained with synthetic aluminum silicates (such as the synthetic chabazites, commonly referred to as "molecular sieves") that impart the necessary cracking activity to the catalyst. The preferred cracking catalyst supports are synthetically-prepared silica-alumina having silica contents in the range of from about 40 to 99 percent. The total amount of nickel sulfide and/or cobalt sulfide components disposed on the support may be varied within relatively wide limits of from about 0.1 to 35 percent (as the metal), based on the weight of the entire catalyst composition.

The catalyst employed in the subject process can be prepared in various ways. For example, the catalyst can be prepared by impregnating a synthetic silica-alumina cracking catalyst support with sufficient nickel nitrate to give the impregnated silica-alumina the desired nickel content. The nitrate is decomposed and the impregnated support is then sulfided by contacting it with hydrogen sulfide or with hydrogen and a low molecular weight mercaptan or organic sulfide at temperatures below about 750° F. and preferably below 700° F. The catalyst can also be prepared by impregnating a silica-alumina support with a nickel compound, drying the impregnated support, and then heating it to a temperature in the range 1200–1600° F. for a period of about 0.25 to 48 hours. After the heat treatment, the catalyst can be sulfided in the manner indicated above at temperatures below 750° F.

The isomerization zone is maintained at an elevated temperature below about 800° F., preferably in the range from about 500–650° F. and the pressure is maintained above about 300 lbs. with a preferred range being about 500–2000 p.s.i.g. Space rates are generally within the range of about .1 to 12.0 L.H.S.V. (liquid hourly space velocity). Inasmuch as the catalyst of the present invention can be employed as an effective hydrocracking catalyst, the reaction conditions of temperature, pressure and space velocity are adjusted within the defined ranges such that hydrocracking is minimized. These reaction conditions are so regulated that there is recovered from the isomerization zone a product stream boiling above the initial boiling point of the feed in an amount equal to at least 80 volume percent of the feed. Under such conditions, and when employing a non-equilibrium xylene feed, the product stream will contain at least 65 volume percent of $C_8$ aromatic hydrocarbon and will be further characterized by a substantially closer approach to alkyl benzene isomerization equilibrium than the initial feed.

The isomerization zone of the present process is well adapted to any type of feed-catalyst contacting system. Thus, such methods as fixed-bed, moving bed, slurry or fluid catalyst systems can be employed by procedures well known in the art. The preferred method is that employing at least one fixed catalyst bed. Catalyst regeneration can be performed, for example, by contacting the deactivated catalyst with an oxygen-containing gas at temperatures of from about 700° to 1000° F. and then reducing the resulting nickel and/or cobalt oxide to the metal and then sulfiding (in situ, if desired) by contacting the catalyst at temperatures below 750° F. with hydrogen and $H_2S$ or gaseous compounds capable of generating $H_2S$. In some cases, it may be desirable to eliminate the reduction step by sulfiding the oxide directly.

The following example illustrates a specific application of the present invention.

EXAMPLE

Three separate, but identical, non-equilibrium xylene mother liquor fractions, obtained from a fractional crystallization plant and deficient in paraxylene, were subjected to separate isomerization reactions. The feeds, along with hydrogen, were each contacted with 50 ml. of catalyst [about 6 weight percent nickel sulfide (as the metal) disposed on a synthetic silica-alumina composite containing about 90 weight percent silica and about 10 weight percent alumina] in a fixed-catalyst bed. In all three runs, after one hour of continuous operation, a halide containing organic compound was continuously introduced into each reaction zone. The halide compounds were fluorobenzene, chlorobenzene and ethyl iodide. After a total run time of 26 hours for each isomerization run, the addition of the halide compound was halted.

The reactor effluents were cooled to room temperature and most of the hydrogen removed at reactor pressure. More hydrogen was removed from the liquid at atmospheric pressure and 50° F. The liquid product was analyzed by mass spectrometric methods for group type and distribution of aromatics and by gas-liquid partition chromatography for $C_8$ aromatic hydrocarbon distribution. The following table presents the run conditions and data obtained from the three separate isomerization runs.

*Table*

|  | Feed | Fluorobenzene Test ||||| Chlorobenzene Test ||||| Ethyl Iodide Test |||||
|---|---|---|---|---|---|---|---|---|---|---|---|---|---|---|---|---|
| Time of Analysis After Start of Run, hrs |  | 1 | 11 | 19 | 26 | 50 | 1 | 11 | 19 | 26 | 50 | 1 | 11 | 19 | 26 | 50 |
| Additive, Concentration in Feed, LV., Percent |  | 0 | .0452% Fluorobenzene ||| 0 | 0 | 0.224% Chlorobenzene ||| 0 | 0 | 0.284% Ethyl Iodide ||| 0 |
| Reactor Conditions: |||||||||||||||||
| Temperature, °F |  | 561 | 559 | 560 | 559 | 560 | 560 | 560 | 560 | 560 | 553 | 561 | 558 | 560 | 560 | 558 |
| Pressure, p.s.i.g |  | 1,200 | 1,200 | 1,200 | 1,200 | 1,200 | 1,200 | 1,200 | 1,200 | 1,200 | 1,200 | 1,200 | 1,200 | 1,200 | 1,200 | 1,200 |
| Liquid Hourly Space Velocity (LHSV), vol./hr.-vol. catalyst |  | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Hydrogen Rate, s.c.f./bbl. liquid feed |  | 5,000 | 5,000 | 5,000 | 5,000 | 5,000 | 5,000 | 5,000 | 5,000 | 5,000 | 5,000 | 5,000 | 5,000 | 5,000 | 5,000 | 5,000 |
| Liquid Product Analysis, LV, Percent: |||||||||||||||||
| Total Naphthenes | 0.7 | 7.1 | 6.9 | 6.6 | 6.4 | 4.9 | 8.1 | 6.9 | 7.4 | 7.0 | 4.0 | 8.3 | 0.7 | 0.8 | 0.7 | 0.9 |
| Total Paraffins | 4.3 | 4.5 | 4.2 | 4.2 | 4.3 | 4.4 | 4.6 | 3.9 | 4.1 | 4.1 | 4.2 | 4.5 | 4.2 | 4.3 | 4.2 | 4.3 |
| Total Aromatics | 95.0 | 88.4 | 88.9 | 89.2 | 89.4 | 90.8 | 87.3 | 89.2 | 88.5 | 88.9 | 91.8 | 87.2 | 95.1 | 94.9 | 95.1 | 94.8 |
| $C_6$ Aromatics | 0.5 | 3.2 | 2.5 | 2.4 | 2.2 | 2.5 | 3.3 | 2.3 | 2.5 | 2.3 | 2.1 | 2.5 | 1.6 | 1.5 | 1.4 | 1.7 |
| $C_7$ Aromatics | 1.0 | 5.4 | 5.5 | 5.7 | 5.6 | 5.8 | 5.5 | 5.7 | 6.0 | 5.9 | 4.5 | 4.2 | 2.6 | 2.6 | 2.5 | 2.8 |
| $C_8$ Aromatics | 93.5 | 67.6 | 68.6 | 68.3 | 67.6 | 69.4 | 67.2 | 66.0 | 66.5 | 66.5 | 74.3 | 71.4 | 83.9 | 84.0 | 84.7 | 83.1 |
| $C_9$ Aromatics |  | 7.5 | 7.7 | 8.2 | 8.7 | 8.4 | 7.1 | 9.3 | 8.7 | 8.8 | 6.5 | 5.5 | 3.7 | 3.3 | 3.4 | 4.1 |
| $C_{10}$ Aromatics |  | 4.7 | 4.6 | 4.6 | 5.0 | 4.7 | 4.2 | 5.6 | 4.4 | 5.1 | 4.4 | 3.6 | 3.3 | 3.0 | 3.2 | 3.1 |
| $C_{11}$ Aromatics |  |  |  |  | 0.3 |  |  | 0.3 | 0.4 | 0.3 |  |  |  |  |  |  |
| Ethylbenzene | 25.2 | 17.1 | 15.6 | 17.0 | 16.2 | 17.0 | 16.7 | 15.7 | 16.5 | 16.8 | 18.4 | 18.4 | 21.2 | 20.7 | 20.8 | 20.7 |
| Orthoxylene | 9.3 | 7.8 | 8.5 | 8.4 | 8.1 | 8.1 | 8.0 | 8.0 | 8.6 | 7.6 | 8.9 | 8.4 | 9.8 | 9.9 | 10.3 | 9.5 |
| Metaxylene | 51.9 | 33.9 | 35.6 | 33.6 | 35.0 | 35.1 | 33.6 | 34.3 | 33.2 | 33.3 | 38.1 | 36.3 | 43.4 | 42.9 | 44.2 | 42.9 |
| Paraxylene | 7.1 | 8.8 | 8.9 | 9.3 | 8.3 | 9.2 | 8.9 | 8.0 | 8.2 | 8.8 | 8.9 | 8.3 | 9.5 | 10.5 | 9.4 | 10.0 |
| Isomerization: |||||||||||||||||
| Para Content of the Three Xylenes, Percent | 10.4 | 17.4 | 16.8 | 18.1 | 16.2 | 17.5 | 17.6 | 15.9 | 16.3 | 17.7 | 15.8 | 15.7 | 15.2 | 16.6 | 14.8 | 16.0 |
| Para Content of Xylenes at Equilibrium, Percent | 23.8 | 23.8 | 23.8 | 23.8 | 23.8 | 23.8 | 23.8 | 23.8 | 23.8 | 23.8 | 23.8 | 23.8 | 23.8 | 23.8 | 23.8 | 23.8 |
| Para Content of Xylenes, Percent of Equilibrium | 44.1–43.3 | 72.9 | 70.7 | 76.1 | 67.9 | 73.6 | 74.1 | 66.9 | 68.6 | 74.5 | 66.4 | 66.1 | 63.7 | 69.5 | 62.0 | 67.3 |
| Disproportionation: |||||||||||||||||
| Gain in Non-$C_8$ Aromatics, Percent absolute |  | 19.3 | 18.8 | 19.4 | 20.3 | 19.9 | 18.6 | 21.7 | 20.5 | 20.9 | 16.0 | 14.3 | 9.7 | 9.4 | 9.0 | 10.2 |
| Non-$C_8$ Content of Aromatics, Percent | 1.6 | 23.5 | 22.8 | 23.4 | 24.4 | 23.6 | 23.0 | 26.0 | 24.9 | 25.2 | 19.1 | 18.1 | 11.8 | 11.5 | 11.0 | 12.3 |
| Non-$C_8$ Content of Aromatics at Equilibrium, Percent [1] | 58.6 | 58.6 | 58.6 | 58.6 | 58.6 | 58.6 | 58.6 | 58.6 | 58.6 | 58.6 | 58.6 | 58.6 | 58.6 | 58.6 | 58.6 | 58.6 |
| Non-$C_8$ Content of Aromatics, Percent of Equilibrium | 2.8 | 40.1 | 38.9 | 39.9 | 41.6 | 40.3 | 39.2 | 44.4 | 42.5 | 43.0 | 32.6 | 30.9 | 20.1 | 19.6 | 18.8 | 21.0 |
| Hydrogenation: Loss in Total Aromatics, Percent absolute |  | 6.6 | 6.1 | 5.8 | 5.6 | 4.2 | 7.7 | 5.8 | 6.5 | 6.1 | 3.2 | 7.8 | 0 | 0.1 | 0 | 0.2 |

[1] Based on equilibrium of methylbenzenes.

From the data presented in the table, it can be seen that the approach to paraxylene equilibrium increased from about 43.5 percent (feed) to an average of about 69.5 percent on all runs, both with and without the addition of halide-containing compounds. Although the addition of the iodide compound does not increase the approach to paraxylene equilibrium over the runs employing the other halides, it can be seen that considerable improvement was realized by using the iodide in reducing the undesirable side reactions of disproportionation and hydrogenation. From the table it can be observed that, when no halide additive was employed, disproportionation remains fairly constant at a level of about 19 to 20 percent. However, after the catalyst had been on-stream one hour and the iodide compound then added, disproportionation amounted to only about 9 percent. Further, when the iodide addition was halted, the amount of disproportionation began to increase somewhat.

It is also apparent from the table that hydrogenation was virtually eliminated when the iodide compound was added to the isomerization zone. In all runs, except when the iodide was present, the loss in aromatic compounds due to hydrogenation, was about 6 or 7 percent. However, when ethyl iodide was added, the loss in aromatics was essentially zero.

I claim:

1. A process for the isomerization of a non-equilibrium xylene feed, which comprises contacting said feed in an isomerization zone, in the presence of hydrogen and at least one organic iodide compound capable of decomposing under the conditions of temperature and pressure in said isomerization zone, with a catalyst comprising a hydrogenation component selected from the group consisting of nickel sulfide and cobalt sulfide disposed on an active siliceous cracking catalyst support at an elevatetd temperature below about 800° F. and at an elevated pressure above about 300 p.s.i.g.

2. The process of claim 1, wherein there is recovered a product stream in an amount equal to at least 80 volume percent of said feed containing at least 65 volume percent $C_8$ aromatic hydrocarbons and further characterized by a substantially closer approach to alkyl benzene isomerization equilibrium than said feed.

References Cited in the file of this patent
UNITED STATES PATENTS

| | | |
|---|---|---|
| 2,642,384 | Cox | June 16, 1953 |
| 2,760,912 | Schwarzenbek | Aug. 28, 1956 |
| 2,781,324 | Haensel | Feb. 12, 1957 |
| 2,784,241 | Holm | Mar. 5, 1957 |
| 2,944,089 | Scott | July 5, 1960 |